(12) United States Patent
Fukui

(10) Patent No.: US 8,330,343 B2
(45) Date of Patent: Dec. 11, 2012

(54) PLASMA DISPLAY DEVICE

(75) Inventor: Yasuhito Fukui, Osaka (JP)

(73) Assignee: Panasonic Corporation, Osaka (JP)

( * ) Notice: Subject to any disclaimer, the term of this patent is extended or adjusted under 35 U.S.C. 154(b) by 771 days.

(21) Appl. No.: 12/528,136

(22) PCT Filed: Feb. 19, 2008

(86) PCT No.: PCT/JP2008/000250
§ 371 (c)(1),
(2), (4) Date: Aug. 21, 2009

(87) PCT Pub. No.: WO2008/102534
PCT Pub. Date: Aug. 28, 2008

(65) Prior Publication Data
US 2010/0013416 A1    Jan. 21, 2010

(30) Foreign Application Priority Data
Feb. 23, 2007    (JP) ................. 2007-043222

(51) Int. Cl.
*H01J 1/46* (2006.01)
(52) U.S. Cl. ................. 313/306; 362/373
(58) Field of Classification Search .......... 315/169.4; 345/60; 313/306; 362/362, 364, 373
See application file for complete search history.

(56) References Cited

U.S. PATENT DOCUMENTS

| | | | |
|---|---|---|---|
| 7,518,572 B2* | 4/2009 | Kong et al. ............ | 345/60 |
| 7,898,510 B2* | 3/2011 | Hori et al. ............ | 345/76 |
| 2006/0232919 A1 | 10/2006 | Jeong | |
| 2008/0136746 A1* | 6/2008 | Kong et al. ............ | 345/60 |
| 2009/0251389 A1 | 10/2009 | Maeda et al. | |
| 2009/0284510 A1 | 11/2009 | Sasaki et al. | |

FOREIGN PATENT DOCUMENTS

| | | |
|---|---|---|
| JP | 10-254372 | 9/1998 |
| JP | 2000-242340 A | 9/2000 |
| JP | 2000-305514 A | 11/2000 |
| JP | 2002-318542 A | 10/2002 |
| JP | 2004-061702 A | 2/2004 |
| JP | 2004-095455 A | 3/2004 |
| JP | 2005-300749 A | 10/2005 |
| JP | 2006-293369 A | 10/2006 |
| JP | 2007-225987 A | 9/2007 |
| WO | WO 2006/106720 A1 | 10/2006 |
| WO | WO 2007/094296 A1 | 8/2007 |

OTHER PUBLICATIONS

International Search Report for Application No. PCT/JP2008/000250., May 1, 2008, Panasonic Corporation.
Japanese Office Action for Application No. 2009-500080., Mar. 15, 2011, Panasonic Corporation.

* cited by examiner

*Primary Examiner* — Thuy Vinh Tran
(74) *Attorney, Agent, or Firm* — RatnerPrestia

(57) ABSTRACT

A plasma display device includes a plasma display panel, a chassis disposed on the plasma display panel with a heat-conducting sheet in between, a small-signal processing circuit board disposed on a rear face of the chassis, a thermal sensor, a thermal sensor fixture for installing the thermal sensor, a front frame, and a back cover having a ventilation area with multiple ventilating holes. The thermal sensor fixture has a shielding wall around the thermal sensor and is disposed on a rear face of the small-signal processing circuit board. The thermal sensor is disposed at an intermediate position between the plasma display panel and the back cover at a position facing the back cover.

13 Claims, 11 Drawing Sheets

| Ambient temperature (°C) | Luminance magnification (-fold) | Assumed maximum temperature rise (°C) | Assumed maximum panel temperature (°C) |
|---|---|---|---|
| 40 | 3 | 60 | 100 |
| 50 | 2 | 50 | 100 |
| 60 | 1 | 40 | 100 |

PLASMA DISPLAY DEVICE

This Application is a U.S. National Phase Application of PCT International Application PCT/JP2008/000250, filed Feb. 19, 2008, which claims priority to Japanese Application JP 2007-043222, filed Feb. 23, 2007.

TECHNICAL FIELD

The present invention relates to plasma display devices used for wall TVs and large monitor screens.

BACKGROUND ART

A plasma display panel (hereafter briefly referred to as a "panel") is a typical AC type surface discharge panel in which many discharge cells are formed between a front plate and a rear plate that are disposed facing each other. In the front plate, multiple display electrode pairs, each including a pair of a scan electrode and a sustain electrode, are formed in parallel on a front glass substrate. A dielectric layer and a protective layer are formed covering these display electrode pairs. In the rear plate, multiple data electrodes are formed in parallel on a rear glass substrate, and a dielectric layer covers these data electrodes. Then, multiple barrier ribs are formed in parallel to data electrodes. A phosphor layer is formed on the surface of the dielectric layer and the side face of the barrier ribs. Then, the front plate and the rear plate are disposed facing each other such that the display electrode pairs and the data electrodes are disposed orthogonal to each other, and sealed. Discharge gas, for example, containing 5% xenon in partial pressure ratio, is filled in an internal discharge space. A discharge cell is formed at an area where the display electrode pair faces the data electrode. In a panel as configured above, an ultraviolet ray is generated by gas discharge in each discharge cell. This ultraviolet ray excites each phosphor of red (R), green (G), and blue (B) to emit light for color display.

In general, a subfield method is adopted as a panel-driving method. More specifically, one field period is divided into multiple subfields. Grayscale display is achieved by combinations of subfields to emit light.

Each subfield includes an initializing period, address period, and sustain period. In the initializing period, an initializing discharge occurs so as to form a wall charge needed for a subsequent address operation on each electrode. At the same time, priming particles (a detonator for discharge=Excited particles) are generated so as to reliably generate address discharge. In the address period, an address pulse voltage is selectively applied to discharge cells to be displayed. This generates address discharge and forms the wall charge (this operation is hereafter also referred to as "address"). In the sustain period, a sustain pulse voltage is applied alternately to the display electrode pair including the scan electrode and the sustain electrode, so as to generate a sustain discharge in the discharge cells where the address discharge has occurred. This makes phosphor layers of corresponding discharge cells emit light, and thus an image is displayed.

In the above operations, heat is generated in the discharge cells in proportion to the number of discharges. Accordingly, a temperature of the panel itself increases by this heat. In addition, a brighter display image requires more number of discharges. A brighter display image thus results in a higher panel temperature. Furthermore, it is generally known that a discharge characteristic changes depending on the discharge cell temperature in this type of panels. Accordingly, too high panel temperature causes unstable discharge. This risks degradation in the image display quality.

Therefore, diversifying methods have been proposed to prevent degradation in the image display quality that may be caused depending on the panel temperature.

For example, one method disclosed is to attach the panel to a chassis with a heat-conducting sheet made of silicone rubber in between. In this method, the heat generated from the panel is efficiently transferred to the chassis so as to prevent a temperature rise in the panel. (For example, refer to Patent Document 1.)

Another method proposed is to detect the panel temperature and apply diversifying corrections depending on detected temperature. For example, one of plasma display devices disclosed is provided with a panel temperature detector for detecting the panel temperature, and an address pulse period is changed depending on temperature information received from the panel temperature detector so as to stabilize the address operation. (For example, refer to Patent Document 2).

Still another method disclosed is to detect an average picture level (APL) of an input video signal and the panel temperature, and control a picture level of a display image depending on the detected APL and detected temperature. The panel temperature is controlled by controlling power consumption in the panel. (For example, refer to Patent Document 3.)

However, since distribution of the panel temperature is not even over a panel area, the entire display area hardly shows uniform temperature. In addition, the panel temperature greatly changes depending on display images. On the other hand, reduction of the number of components configuring the plasma display device has been strongly demanded. It is thus difficult to increase the number of thermal sensors to be installed.

Accordingly, accurate detection of the panel temperature is difficult in a plasma display device in which the number of thermal sensors that can be installed is limited. Still more, a recent trend of larger panel and larger plasma display device makes accurate detection of the panel temperature more difficult.

Furthermore, in recent years, a brighter display is studied in order to improve the image display quality. In a plasma display device that is configured to increase luminance of light emission by increasing the discharge current, the panel temperature increases further easily.

Accordingly, it is becoming more difficult to maintain an appropriate panel temperature in the recent trend of a larger panel for plasma display devices and higher luminance.

However, the control of panel temperature to an appropriate level is becoming more important in order to display high-grade images. Therefore, a simple structure for keeping an appropriate panel temperature in plasma display devices for larger panel and brighter image is strongly demanded.

Patent Document 1: Japanese Patent Unexamined Publication No. H10-254372
Patent Document 2: Japanese Patent Unexamined Publication No. 2004-61702
Patent Document 3: Japanese Patent Unexamined Publication No. 2000-305514

SUMMARY OF THE INVENTION

A plasma display device of the present invention includes a panel with multiple discharge cells having scan electrodes, sustain electrodes, and data electrodes; a back cover disposed facing the panel; a thermal sensor disposed facing the back cover; a thermal sensor fixture for installing the thermal sensor; and a housing including a front frame and a back cover and housing the panel. The thermal sensor fixture and the thermal sensor are disposed at an intermediate position between the panel and the back cover, and a shielding is provided between the panel and the thermal sensor fixture.

In this structure, an effect of local temperature change in the panel can be reduced when the thermal sensor detects ambient temperature of the plasma display device.

Alternatively, a drive circuit in the plasma display device of the present invention may adjust luminance of a display image based on the temperature detected by the thermal sensor so as to control power consumption by the plasma display device.

This enables the control of power consumption in the panel based on the temperature detected by the thermal sensor. Accordingly, with a relatively simple structure, an assumed maximum panel temperature can be suppressed within the upper limit of panel specifications so as to keep an appropriate panel temperature.

REFERENCE MARKS IN THE DRAWINGS

Figure 1:
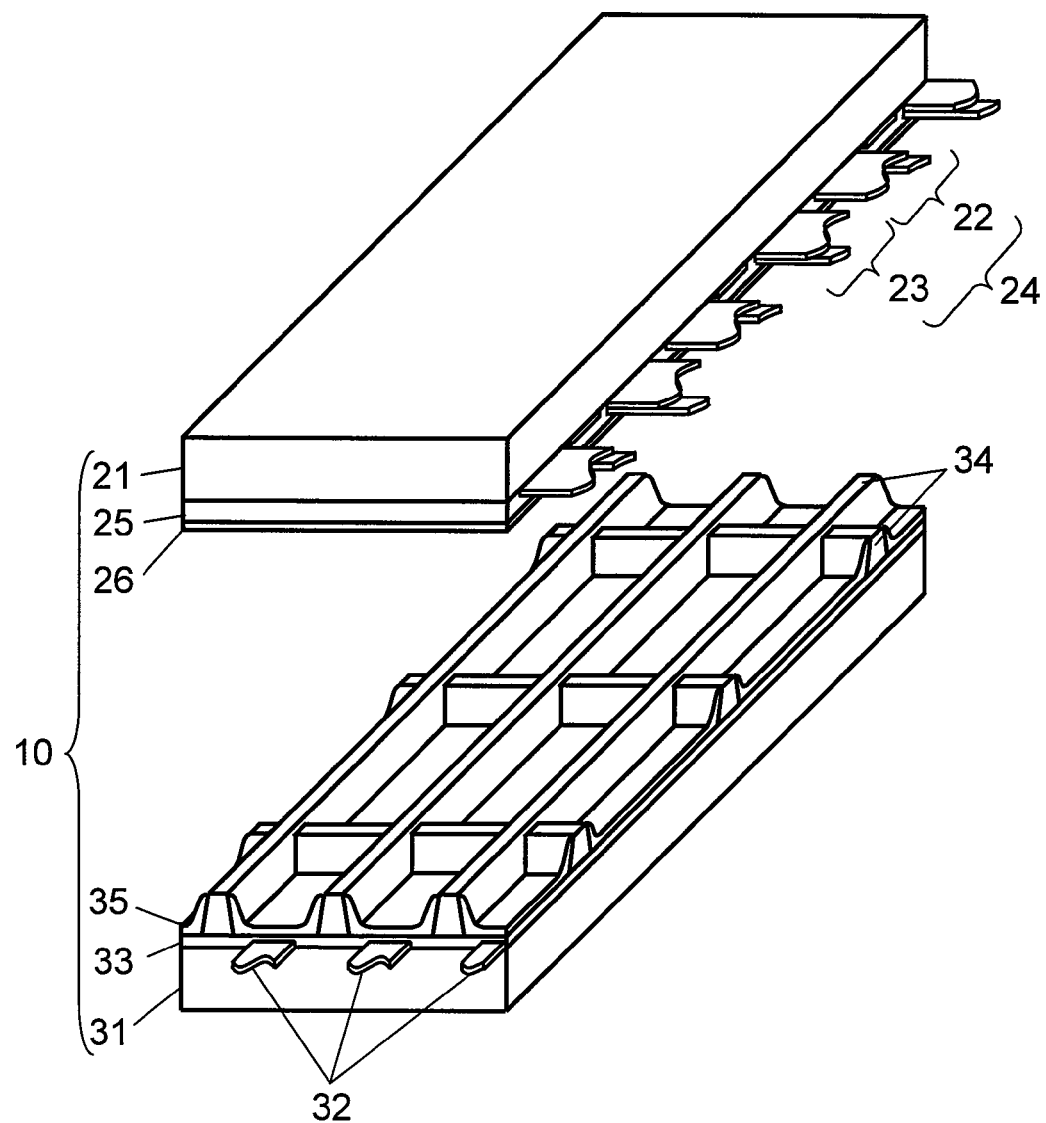
FIG. 1 is an exploded perspective view illustrating a panel structure in accordance with an exemplary embodiment of the present invention.

1 Plasma display device
2 Front frame
3 Back cover
4 Ventilating hole
5 Ventilation area
10 Panel
11 Heat-conducting sheet
12 Chassis
13a Data electrode drive circuit board
13b Scan electrode drive circuit board
13c Sustain electrode drive circuit board
14 Power circuit board
15 Small-signal processing circuit board
16 Thermal sensor fixture
17 Shielding wall
18 Tuner board
19 Flexible cable
21 Front plate
22 Scan electrode
23 Sustain electrode
24 Display electrode pair
25, 33 Dielectric layer
26 Protective layer
31 Rear plate
32 Data electrode
34 Barrier rib
35 Phosphor layer
41 Image signal processing circuit
42 Data electrode drive circuit
43 Scan electrode drive circuit
44 Sustain electrode drive circuit
45 Timing generating circuit
48 Temperature detecting circuit
49 Thermal sensor
50, 60 Sustain pulse generating circuit
51, 56 Power recovery circuit
52, 57 Clamping circuit
53 Initializing waveform generating circuit
54 Scan pulse generating circuit
55 Address pulse generating circuit
58 Address pulse output circuit
Q1, Q2, Q3, Q4, Q11, Q12, Q13, Q14, Q21, Q31, Q32, Q33, Q34, QH1 to QHn, QL1 to QLn Switching element
C1, C10, C11, C21, C31 Capacitor
L1, L31 Inductor
D1, D2, D10, D21, D31, D32 Diode

DETAILED DESCRIPTION OF PREFERRED EMBODIMENTS

A plasma display device in an exemplary embodiment of the present invention is described below with reference to drawings.

Exemplary Embodiment

FIG. 1 is an exploded perspective view of a structure of plasma display panel 10 (hereafter abbreviated as a "panel") in the exemplary embodiment of the present invention. Multiple display electrode pairs 24, each of which including scan electrode 22 and sustain electrode 23, are formed on front plate 21 made of glass. Dielectric layer 25 is formed covering scan electrode 22 and sustain electrode 23. Protective layer 26 is formed on this dielectric layer 25.

Protective layer 26 is made of a material mainly containing MgO, which is a proven panel material for reducing discharge start voltage in a discharge cell. MgO also has a large secondary electron emission coefficient and thus shows good durability when neon (Ne) and xenon (Xe) gases are encapsulated.

Multiple data electrodes 32 are formed on rear plate 31, and dielectric layer 33 is formed covering data electrodes 32. Barrier ribs 34 are formed in a grid on this dielectric layer 33. Phosphor layer 35 that emits light in each color of red (R), green (G), and blue (B), respectively, is provided on a side face of barrier ribs 34 and on a surface of dielectric layer 33.

These front plate 21 and rear plate 31 are disposed facing each other such that display electrode pairs 24 and data electrodes 32 cross each other with a small discharge space in between. Peripheries of these plates are sealed with a sealant such as glass frit. A gas mixture of typically neon and xenon is filled as discharge gas in the discharge space. Barrier ribs 34 partition the discharge space into multiple sections, and a discharge cell is formed at each cross-section of display electrode pair 24 and data electrode 32. An image is displayed by discharging electricity and emitting light from these discharge cells.

The structure of panel 10 is not limited to the above structure. For example, striped barrier ribs may be provided.

Figure 2:
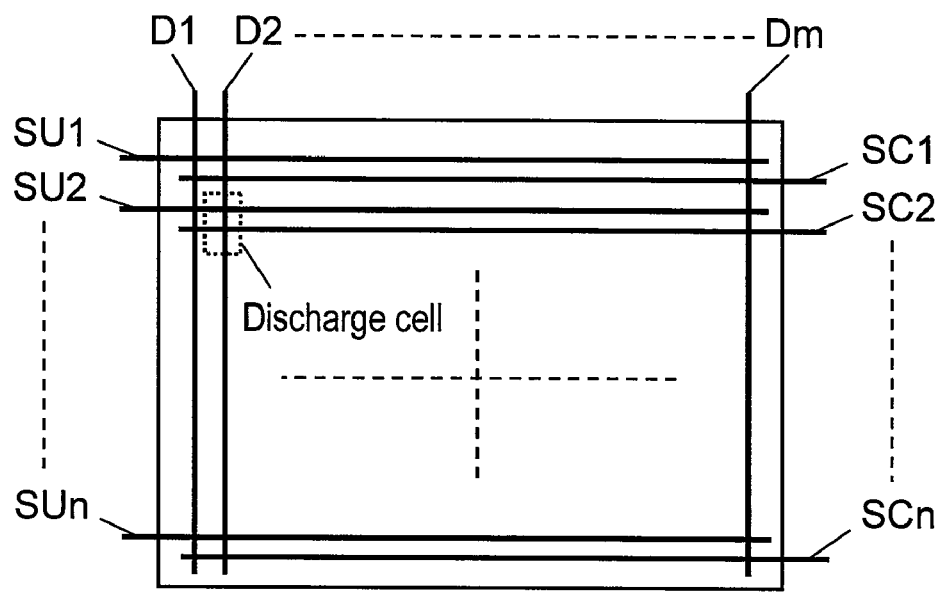
FIG. 2 is an electrode layout in the panel.

FIG. 2 is an electrode layout in panel 10 in the exemplary embodiment of the present invention. Panel 10 includes the n number of scan electrodes SC1 to SCn (scan electrodes 22 in FIG. 1) and the n number of sustain electrodes SU1 to SUn (sustain electrodes 23 in FIG. 1) row-wise, and the m number of data electrodes D1 to Dm (data electrode 32 in FIG. 1) column-wise. The discharge cell is formed at an area where a pair of scan electrode SCi (i=1 to n) and sustain electrode SUi crosses one data electrode Dj (j=1 to m). In the discharge space, the m×n number of discharge cells is formed. As shown in FIGS. 1 and 2, large interelectrode capacitance Cp exists between scan electrodes SC1 to SCn and sustain electrodes SU1 to SUn because scan electrode SCi and sustain electrode SUi are a parallel pair. Interelectrode capacitance also exists at a cross-section where scan electrode SCi and sustain electrode SUi cross data electrode Dj.

Next, a drive voltage waveform for driving panel 10 and its operation are outlined. The plasma display device in this exemplary embodiment adopts a subfield method. In other words, one field period is divided into multiple subfields. Grayscale display is achieved by controlling emission and non-emission of light from each discharge cell for each subfield. Each subfield includes an initializing period, an address period, and a sustain period.

In each subfield, initializing discharge occurs in the initializing period so as to form a wall charge needed for subsequent address discharge on each electrode. In addition, the initializing discharge serves to generate priming particles (a detonator for discharge=Excited particles) for stable generation of address discharge by reducing discharge delay. The initializing operation at this point includes the initializing operation for generating initializing discharge in all discharge cells (hereafter referred to as "all-cell initialization") and the initializing operation for generating initializing discharge only in selected discharge cells where sustain discharge took place in an immediately preceding subfield (hereafter referred to as "selective initialization").

In the address period, selective address discharge occurs so as to form a wall charge in discharge cells to emit light in a subsequent sustain period. In the sustain period, the number of sustain pulses proportional to luminance weight is alternately applied to display electrode pair 24. This generates sustain discharge in discharge cells where address discharge has occurred, and the light is emitted. A proportional constant in this operation is called "luminance magnification."

Figure 3:
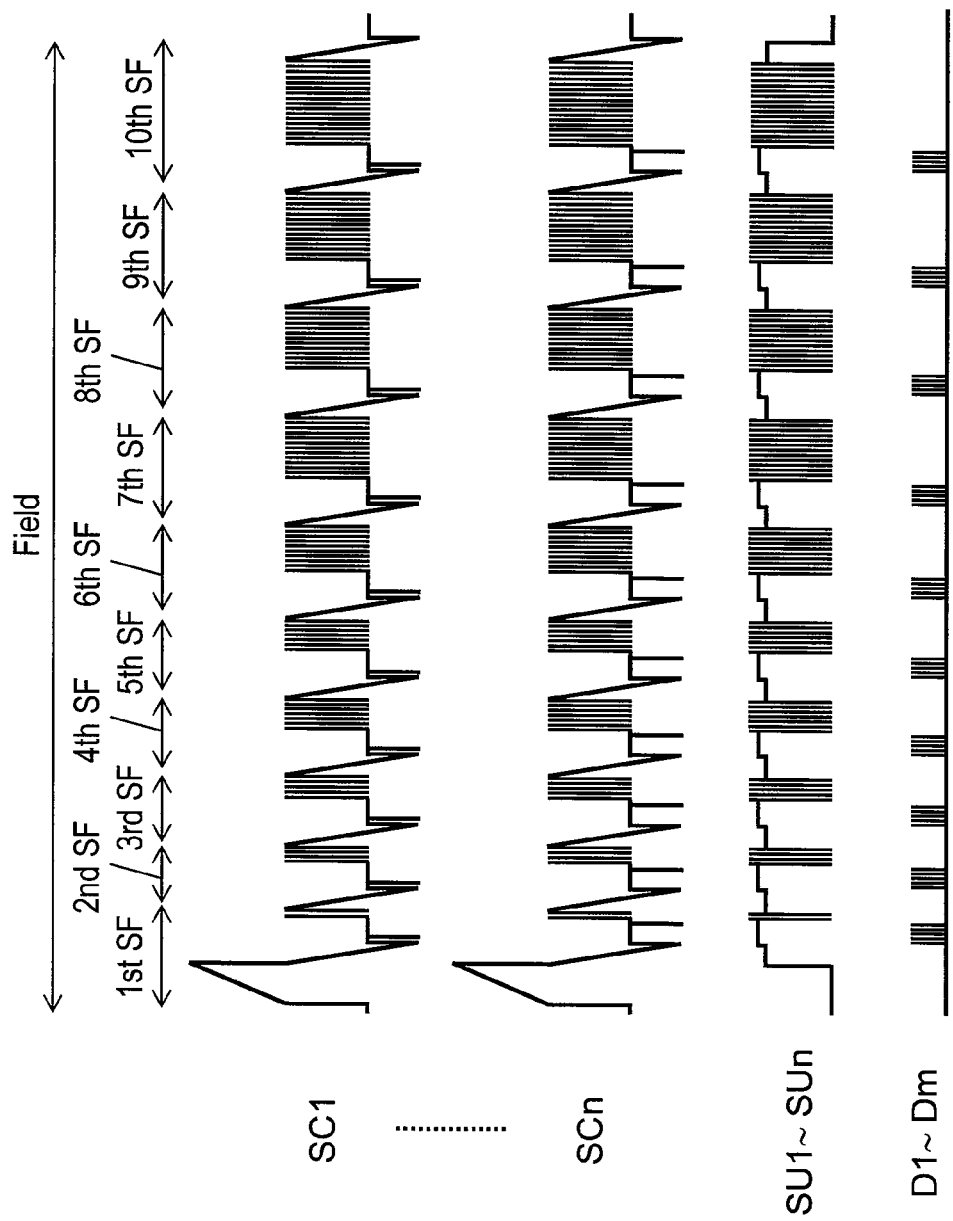
FIG. 3 is a subfield structure in accordance with the exemplary embodiment of the present invention.

FIG. 3 illustrates a subfield structure in the exemplary embodiment of the present invention. FIG. 3 shows an outline of a drive waveform in one field period in the subfield method, and the drive voltage waveform is detailed later.

In this exemplary embodiment, one field includes ten subfields (first SF, second SF . . . tenth SF), and each subfield is given luminance weight of 1, 2, 3, 6, 11, 18, 30, 44, 60, and 80, respectively. In the initializing period of the first SF, the all-cell initialization takes place. In the initializing period of the second SF to the tenth SF, the selective initialization takes place. Accordingly, the light emission not related to an image to be displayed only occurs related to discharge in the all-cell initialization in the first SF. The luminance of a black display area in discharge cells where no sustain discharge is generated is only a faint light in the all-cell initialization. This achieves display of a high contrast image. In the sustain period of each subfield, the number of sustain pulses calculated by multiplying the luminance weight of each subfield by a predetermined luminance magnification is applied to display electrode pair 24, respectively.

However, in this exemplary embodiment, the number of subfields or the luminance weight of each subfield is not limited to the above values. A subfield structure may be switched based on image signals, and so on.

In this exemplary embodiment, luminance magnification is not fixed. It is changed based on a temperature detected by a thermal sensor described later. In this way, power consumption in panel 10 is controlled to keep an appropriate temperature for panel 10. This is detailed later.

Figure 4:
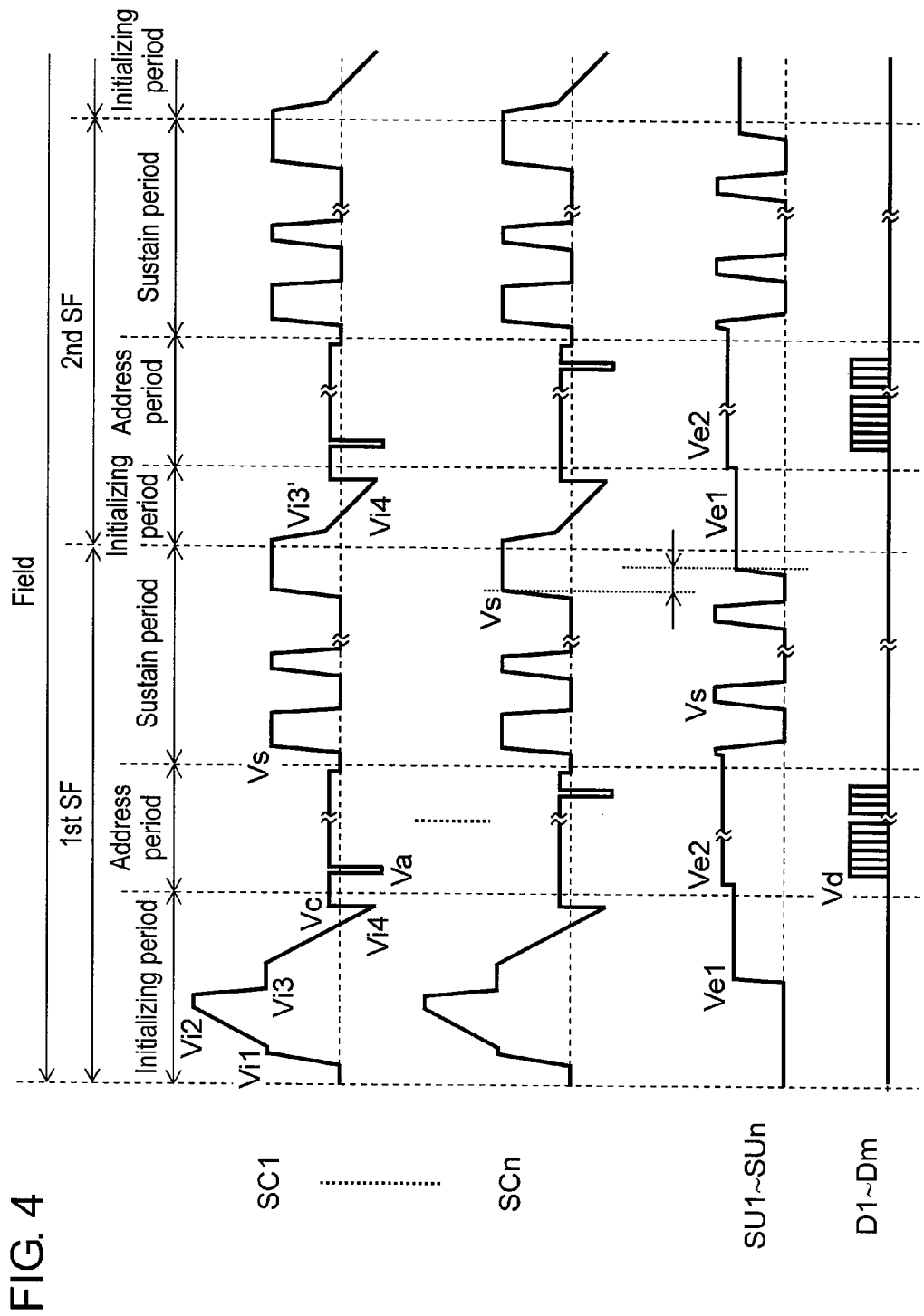
FIG. 4 illustrates a drive voltage waveform applied to each panel electrode in accordance with the exemplary embodiment of the present invention.

FIG. 4 is a drive voltage waveform applied to each electrode of panel 10 in the exemplary embodiment of the present invention. FIG. 4 shows the drive voltage waveform for two subfields, i.e., a subfield to which the all-cell initialization is applied (hereafter referred to as the "all-cell initialized subfield"), and a subfield to which the selective initialization is applied (hereafter referred to as the "selectively initialized subfield"). A similar drive voltage waveform is also applied to other subfields.

First, the first SF, which is the all-cell initialized subfield, is described. In a first half of the initializing period of the first SF, 0 (V) is applied to data electrodes D1 to Dm and sustain electrodes SU1 to SUn, respectively. Ramp waveform voltage is applied to scan electrodes SC1 to SCn with respect to sustain electrodes SU1 to SUn. This ramp waveform voltage (hereafter referred to as the "ramp-rise waveform voltage") gradually rises from voltage Vi1, which is not greater than the discharge start voltage, to voltage Vit, which is higher than the discharge start voltage.

While this ramp-rise waveform voltage is on the rise, a faint initializing discharge occurs continuously between scan electrodes SC1 to SCn and sustain electrodes SU1 to SUn, and data electrodes D1 to Dm. Then, a negative wall voltage is accumulated on upper parts of scan electrodes SC1 to SCn, and a positive wall voltage is accumulated on upper parts of data electrodes D1 to Dm and upper parts of sustain electrodes SU1 to SUn. The wall voltage on the upper part of electrode is voltage generated by the wall charge accumulated on the dielectric layer, protective layer, and phosphor layer, and so on those cover the electrode.

In the latter half of the initializing period, positive voltage Ve1 is applied to sustain electrodes SU1 to SUn, and 0 (V) is applied to data electrodes D1 to Dm. A ramp waveform voltage is applied to scan electrodes SC1 to SCn with respect to sustain electrodes SU1 to SUn. This ramp waveform voltage (hereafter referred to as the "ramp-down waveform voltage") gradually falls from voltage Vi3, which is not greater than the discharge start voltage, to voltage Vi4, which is higher than the discharge start voltage. During this time, a faint initializing discharge continuously occurs between scan electrodes SC1 to SCn and sustain electrodes SU1 to SUn, and between scan electrodes SC1 to data electrodes D1 to Dm. Then, the negative wall voltage on upper parts of scan electrodes SC1 to SCn and the positive wall voltage on upper parts of sustain electrodes SU1 to SUn are weakened so that the positive wall voltage on upper parts of data electrodes D1 to Dm is adjusted to a value appropriate for the address operation. This completes the all-cell initialization that generates initializing discharge in all discharge cells.

As shown in the initializing period of the second SF in FIG. 4, the drive voltage waveform that omits the first half of the initializing period may be applied to each electrode. More specifically, voltage Ve1 is applied to sustain electrodes SU1 to SUn, 0 (V) is applied to data electrodes D1 to Dm, and the ramp-down waveform voltage that gradually falls from voltage Vi3' to voltage Vi4 is applied to scan electrodes SC1 to SCn. This generates a faint initializing discharge in discharge cells in which sustain discharge has occurred in the sustain period in a previous subfield. The wall voltage on the upper part of scan electrode SCi and the upper part of sustain electrode SUi are thus weakened. In addition, in discharge cells where sufficient positive wall voltage is accumulated on the upper part of data electrode Dk (k=1 to m), an excessive portion of this wall voltage is discharged so as to adjust the wall voltage appropriate for the address operation. On the other hand, in discharge cells where no sustain discharge has occurred in the previous subfield, no discharge takes place, and the wall charge accumulated on completing the initializing period in the previous subfield is sustained. As described above, if the first half of the initializing operation is omitted, the initializing operation becomes the selective initialization that executes initializing discharge in discharge cells where the sustain operation has taken place in the sustain period in the immediately-preceding subfield.

In the subsequent address period, voltage Ve2 is applied to sustain electrodes SU1 to SUn, and voltage Vc is applied to scan electrodes SC1 to SCn.

Then, negative scan pulse voltage Va is applied to scan electrode SC1 in the first line, and positive address pulse voltage Vd is applied to data electrode Dk (k=1 to m) of discharge cells to emit light in the first line, out of data electrodes D1 to Dm. A voltage difference at an intersection between data electrode Dk and scan electrode SC1 is a sum of a difference in external applied voltages (Vd−Va), and a difference between the wall voltage on data electrode Dk and the wall voltage on scan electrode SC1. This voltage difference exceeds the discharge start voltage. Accordingly, discharge occurs between data electrode Dk and scan electrode SC1. In addition, since voltage Ve2 is applied to sustain electrodes SU1 to SUn, a voltage difference between sustain electrode SU1 and scan electrode SC1 is a sum of a difference in external applied voltages (Ve2−Va) and a difference between the wall voltage on sustain electrode SU1 and the wall voltage on scan electrode SC1. Here, a condition that likely to generate discharge, although discharge does not actually takes place, can be created between sustain electrode SU1 and scan electrode SC1 by setting voltage Ve2 that slightly falls below the discharge start voltage. Triggered by discharge generated between data electrode Dk and scan electrode SC1, discharge can be generated between sustain electrode SU1 and scan electrode SC1 in an area where they cross with data electrode Dk. In this way, address discharge occurs in a discharge cell to emit light. The positive wall voltage is accumulated on scan electrode SC1, the negative wall voltage is accumulated on sustain electrode SU1, and the negative wall voltage is accumulated also on data electrode Dk.

As described above, address discharge occurs in discharge cells to emit light in the first line, and the wall voltage is accumulated on each electrode in the address operation. On the other hand, voltage at cross sections of data electrodes D1 to Dm, where no address pulse voltage Vd is applied, and scan electrode SC1 does not exceed the discharge start voltage, and thus address discharge does not occur. The above address operation is executed up to discharge cells on the nth line, and the address period is completed.

In the subsequent sustain period, positive sustain pulse voltage Vs is first applied to scan electrodes SC1 to SCn, and a ground potential that becomes a base potential, i.e., 0 (V), is applied to sustain electrodes SU1 to SUn. Then, a voltage difference between scan electrode SCi and sustain electrode SUi becomes the sum of sustain pulse voltage Vs and a difference in wall voltages on scan electrode SCi and sustain electrode SUi in discharge cells where address discharge has occurred. This voltage difference exceeds the discharge start voltage.

Accordingly, sustain discharge occurs between scan electrode SCi and sustain electrode SUi, and phosphor layer 35 emits light by ultraviolet ray generated at this point. Then, the negative wall voltage is accumulated on scan electrode SCi, and the positive wall voltage is accumulated on sustain electrode SUi. Still more, the positive wall voltage is also accumulated on data electrode Dk. Sustain discharge does not occur in discharge cells where address discharge has not occurred in the address period, and thus the wall voltage accumulated on completing the initializing period is sustained.

Next, 0 (V), which is a base potential, is applied to scan electrodes SC1 to SCn, and sustain pulse voltage Vs is applied to sustain electrodes SU1 to SUn, respectively. Then, a voltage difference on sustain electrode SUi and scan electrode SCi exceeds the discharge start voltage in discharge cells where sustain discharge has occurred. Accordingly, sustain discharge occurs again between sustain electrode SUi and scan electrode SCi. The negative wall voltage is thus accumulated on sustain electrode SUi, and the positive wall voltage is accumulated on scan electrode SCi. In the same way, the number of pulses, which is calculated by multiplying the luminance weight by luminance magnification, is applied alternately to scan electrodes SC1 to SCn and sustain electrodes SU1 to SUn so as to give potential difference between electrodes of display electrode pair 24. This enables continuous sustain discharge in discharge cells where address discharge has occurred in the address period.

At the last of the sustain period, a so-called narrow pulse voltage difference is applied between scan electrodes SC1 to SCn and sustain electrodes SU1 to SU so as to adjust the wall voltage on scan electrode SCi and sustain electrode SUi while the positive wall voltage remains on data electrode Dk.

In subsequent subfields, the operation is mostly the same as that described above, except for the number of sustain pulses in the sustain period, and thus its description is omitted. This is the outline of the drive voltage waveform applied to each electrode of panel 10 in this exemplary embodiment.

If the first SF to the tenth SF have a luminance weight of 1, 2, 3, 6, 11, 18, 30, 44, 60, and 80, respectively, the number of sustain pulses in each subfield is 1, 2, 3, 6, 11, 18, 30 44, 60, and 80, respectively, at one-fold luminance magnification. At two-fold luminance magnification, each luminance weight is doubled, and becomes 2, 4, 6, 12, 22, 36, 60, 88, 120, and 160. At three-fold luminance magnification, the luminance weight is tripled, and becomes 3, 6, 9, 18, 33, 54, 90, 132, 180, and 240. In this exemplary embodiment, as described above, this luminance magnification is changed based on a temperature detected by the thermal sensor described later so as to control the total number of sustain pulses in one field period. In this way, power consumption in panel 10 is controlled to keep an appropriate temperature for panel 10.

Figure 5:
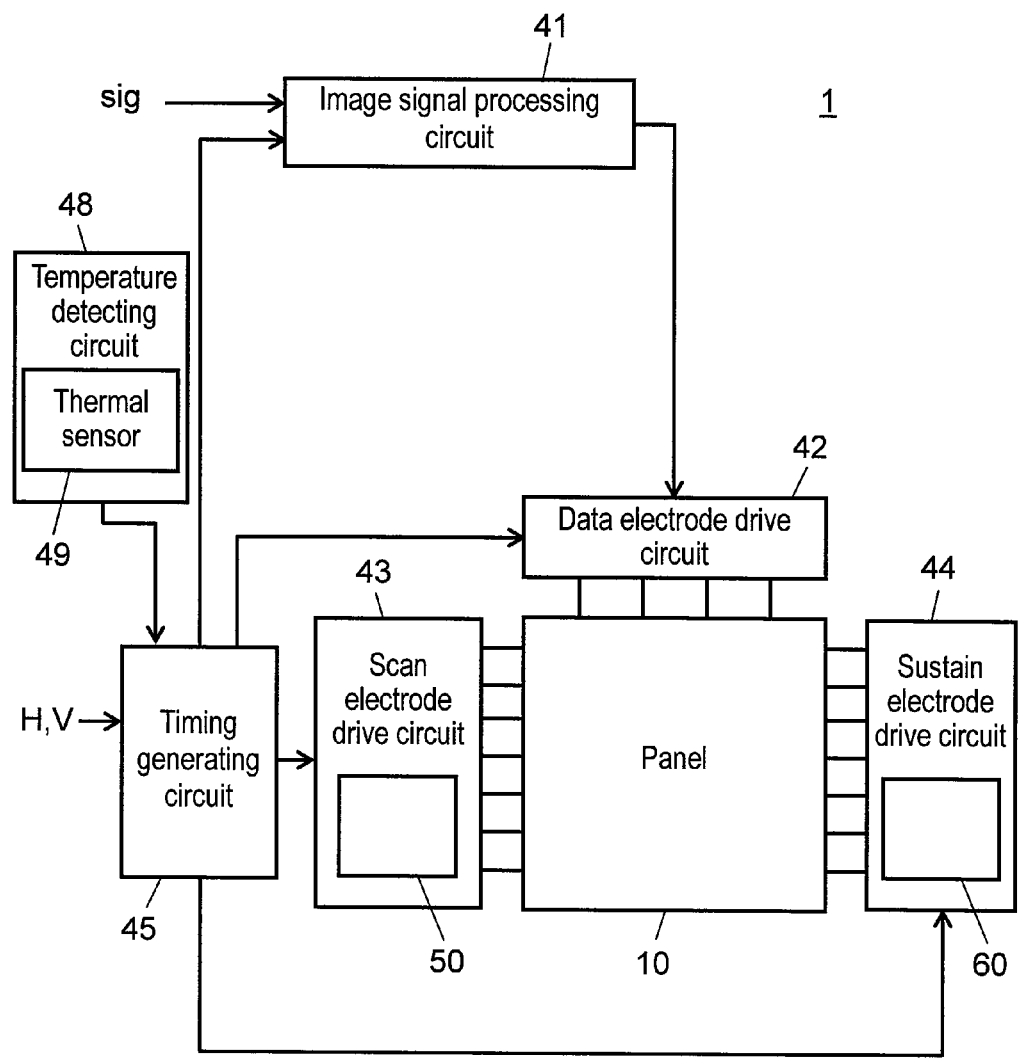
FIG. 5 is a circuit diagram of a plasma display device in accordance with the exemplary embodiment of the present invention.

Next, a structure of the plasma display device in this exemplary embodiment is described. FIG. 5 is a circuit block diagram of the plasma display device in the exemplary embodiment of the present invention. Plasma display device 1 includes panel 10, image signal processing circuit 41, data electrode drive circuit 42, scan electrode drive circuit 43, sustain electrode drive circuit 44, timing generating circuit 45, temperature detecting circuit 48, and power circuit (not illustrated) for supplying required power to each circuit block.

Image signal processing circuit 41 converts input image signal sig to image data that indicates emission and non-emission of light from each subfield. Data electrode drive circuit 42 converts image data in each subfield to a signal corresponding to each of data electrodes D1 to Dm, and drives data electrodes D1 to Dm.

Temperature detecting circuit 48 includes thermal sensor 49 that is configured of a generally-known element, such as a thermo couple, for detecting temperatures. Temperature detecting circuit 48 compares a temperature detected by thermal sensor 49 with a first predetermined temperature, and outputs a signal indicating a comparison result. More specifically, whether or not the detected temperature is below the first predetermined temperature is compared, and if the detected temperature is the same or higher than the first predetermined temperature, a signal indicating how much higher than the first predetermined temperature is output to timing generating circuit 45.

In this exemplary embodiment, the first predetermined temperature is set to 45° C. However, the temperature is not limited to this value. An appropriate value is preferably set based on panel characteristics and specifications of the plasma display device.

Timing generating circuit 45 generates a range of timing signals for controlling the operation of each circuit block based on horizontal synchronizing signal H, vertical synchronizing signal V, and output from temperature detecting circuit 48; and supplies these timing signals to circuit blocks, respectively. In this exemplary embodiment, the luminance magnification is controlled based on the temperature detected by thermal sensor 49, as described above. Accordingly, a corresponding timing signal is output to scan electrode drive circuit 43 and sustain electrode drive circuit 44. This enables the control of the total number of sustain pulses in one field period so as to control power consumption. Accordingly, the panel is controlled to keep an appropriate temperature.

Scan electrode drive circuit 43 includes an initializing waveform generating circuit (not illustrated) for generating the initializing waveform voltage applied to scan electrodes SC1 to SCn in the initializing period, sustain pulse generating circuit 50 for generating the sustain pulse voltage applied to scan electrodes SC1 to SCn in the sustain period, and a scan pulse generating circuit (not illustrated) for generating the scan pulse voltage applied to scan electrodes SC1 to SCn in the address period. Scan electrode drive circuit 43 drives each of scan electrodes SC1 to SCn based on the timing signal. Sustain electrode drive circuit 44 includes sustain pulse generating circuit 60 and a circuit for generating voltage Ve1 and voltage Vet; and drives sustain electrodes SU1 to SUn based on the timing signal.

In each of the electrode drive circuits that generates discharge from discharge cells by driving each electrode, high voltage ranging from several tens of volts to hundred and tens of volts is applied to each electrode, and extremely large current of around several tens of amperes needs to travel for discharge. Therefore, each electrode drive circuit generates extremely large Joule heat. In addition, since panel 10 displays an image by the combination of emission and non-emission of light from each discharge cell, discharge from each discharge cell differs according to a pattern of display image. Accordingly, the heat generated also greatly varies depending on a pattern of display image.

On the other hand, signals handled in image signal processing circuit 41 and timing generating circuit 45 involve voltage from several volts to dozen volts at most, and thus they are significantly lower than that of the above drive circuits (these circuits are hereafter collectively called "small-signal processing circuit"). Current that needs to be traveled is also significantly small, and variations in the current level is also relatively small since the operation is mostly fixed regardless of patterns of display images. Accordingly, Joule heat generated is sufficiently small, and its variations are also small.

Figure 6:
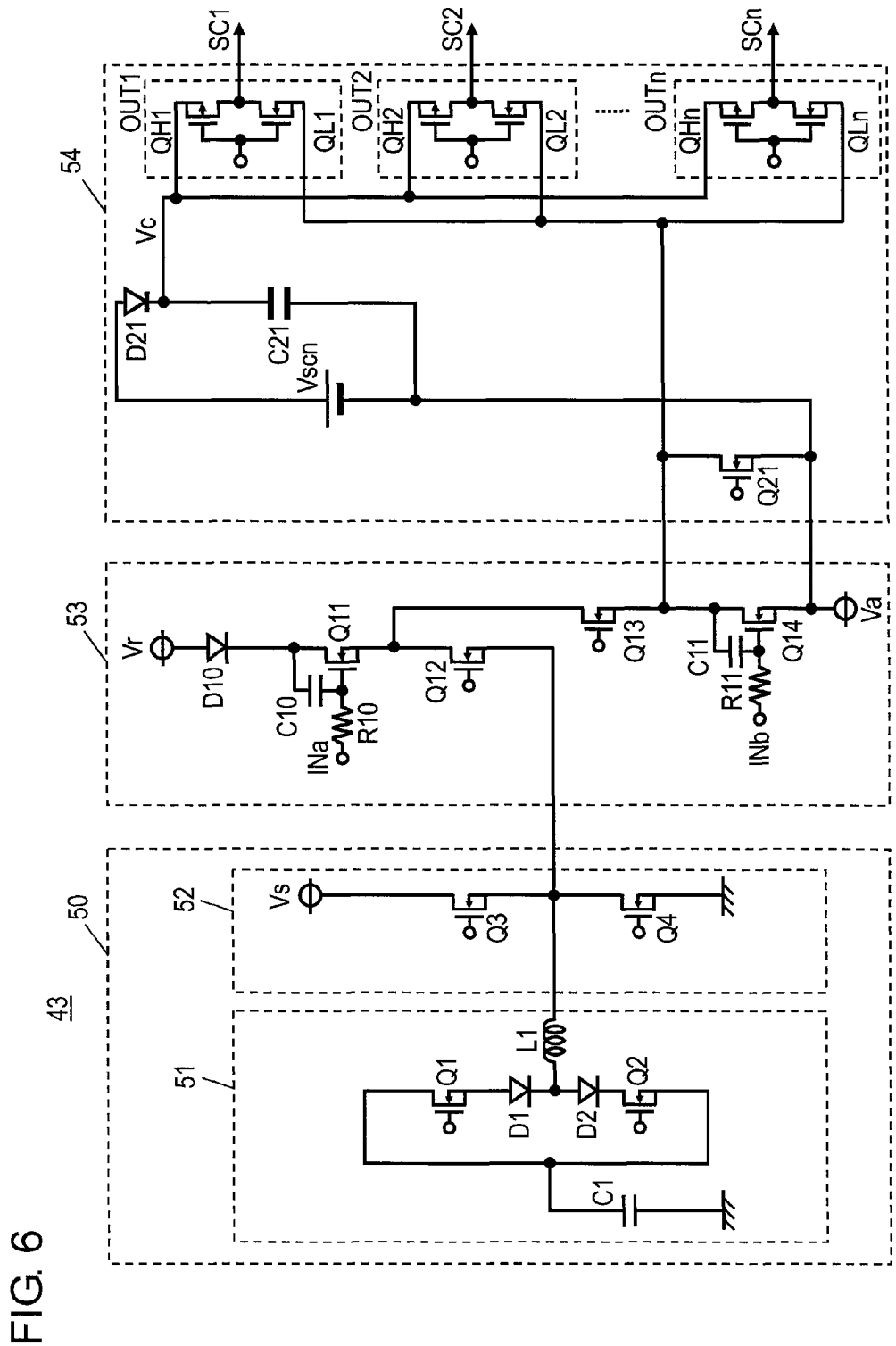
FIG. 6 is a circuit block diagram of a scan electrode drive circuit in accordance with the exemplary embodiment of the present invention.

Next, each electrode drive circuit is detailed. First, details and the operation of scan electrode drive circuit 43 are described. FIG. 6 is a circuit diagram of scan electrode drive circuit 43 in this exemplary embodiment of the present invention. Scan electrode drive circuit 43 includes sustain pulse generating circuit 50 for generating a sustain pulse, initializing waveform generating circuit 53 for generating an initializing waveform, and scan pulse generating circuit 54 for generating a scan pulse.

Sustain pulse generating circuit 50 includes power recovery circuit 51 and clamping circuit 52. Power recovery circuit 51 includes power-recovery capacitor C1, switching elements Q1 and Q2, back-flow preventing diodes D1 and D2, and resonance inductor L1. Power-recovery capacitor C1 has a sufficiently large capacitance compared to interelectrode capacitance Cp, and is charged to about a half of voltage Vs, i.e., Vs/2, so that capacitor C1 can serve as a power source for power recovery circuit 51. Clamping circuit 52 includes switching element Q3 for clamping scan electrodes SC1 to SCn to voltage Vs, and switching element Q4 for clamping scan electrodes SC1 to SCn to 0 (V). Clamping circuit 52 also generates sustain pulse voltage Vs based on a timing signal output from timing generating circuit 45.

For example, to launch the sustain pulse waveform, switching element Q1 is turned on, and interelectrode capacitance Cp and inductor L1 are resonated so as to supply power from power-recovery capacitor C1 to scan electrodes SC1 to SCn through switching element Q1, diode D1, and inductor L1. Then, switching element Q3 is turned on when voltage of scan electrodes SC1 to SCn comes close to Vs so as to clamp scan electrodes SC1 to SCn to voltage Vs.

Contrarily, to end the sustain pulse waveform, switching element Q2 is turned on, and interelectrode capacitance Cp and inductor L1 are resonated so as to recover power from interelectrode capacitance Cp to power-recovery capacitor C1 through inductor L1, diode D2, and switching element Q2. When voltage of scan electrodes SC1 to SCn reaches close to 0 (V), switching element Q4 is turned on to clamp scan electrodes SC1 to SCn to 0 (V).

Initializing waveform generating circuit 53 includes a Miller integrating circuit, which includes switching element Q11, capacitor C10, and resistor R10, for generating ramp-rise waveform voltage that gradually rises up to voltage Vi2 in a ramp state; another Miller integrating circuit, which includes switching element Q14, capacitor C11, and resistor R11, for generating ramp-down waveform voltage that gradually falls down to predetermined initializing voltage V14; a separation circuit using switching element Q12; and a separation circuit using switching element Q13. Initializing waveform generating circuit 53 generates aforementioned initializing waveform based on the timing signal output from timing generating circuit 45. In FIG. 6, input terminals of the Miller integrating circuits are indicated as input terminal INa and input terminal INb, respectively.

For example, to generate the ramp-rise waveform voltage in the initializing waveform, input terminal INa is switched to "Hi" by applying a predetermined voltage (e.g. 15 V). Then, a certain current travels from resistor R10 to capacitor C10, the source voltage of switching element Q11 rises in the ramp state, and the output voltage of scan electrode drive circuit 43 also starts to rise in the ramp state.

To generate the ramp-down waveform voltage in the initializing waveform in the all-cell initialization and the selective initialization, input terminal INb is switched to "Hi" by applying a predetermined voltage (e.g., 15 V) to input terminal INb. Then, a certain current travels from resistor R11 to capacitor C11. Drain voltage of switching element Q14 falls in the ramp state, and the output voltage of scan electrode drive circuit 43 also starts to fall in the ramp state.

Scan pulse generating circuit 54 includes switch circuits OUT1 to OUTn that output the scan pulse voltage to each of scan electrodes SC1 to SCn; switching element Q21 for clamping the low-voltage side of switch circuits OUT1 to OUTn to voltage Va; and diode D21 and capacitor C21 for applying voltage Vc, in which voltage Va is superimposed on voltage Vscn, to the high-voltage side of switch circuits OUT1 to OUTn. Switch circuits OUT1 to OUTn include switching elements QH1 to QHn for outputting voltage Vc and switching elements QL1 to QLn for outputting voltage Va, respectively. Based on a timing signal output from timing generating circuit 45, scan pulse voltage Va applied to scan electrodes SC1 to SCn is sequentially generated in the address period. Scan pulse generating circuit 54 outputs the voltage waveform of initializing waveform generating circuit 53 in the initializing period, and outputs the voltage waveform of sustain pulse generating circuit 50 in the sustain period without any change.

As described above, an extremely large current needs to be traveled in scan electrode drive circuit 43 so as to generate initializing discharge, address discharge, and sustain discharge by driving scan electrodes SC1 to SCn. This results in generating large Joule heat. Furthermore, since generation of sustain discharge varies depending on display images, the heat generated also greatly varies depending on patterns of display images.

In this exemplary embodiment, the Miller integrating circuit employing FET, which is practical and has a relatively simple structure, is adopted in initializing waveform generating circuit 53. However, the present invention is not limited to this structure. Any circuit is applicable as long as the ramp-rise waveform voltage and the ramp-down waveform voltage can be generated.

Although not illustrated in a drawing, the sustain pulse generating circuit in sustain electrode drive circuit 44 has the same structure as sustain pulse generating circuit 50, and includes a power recovery circuit for recovering power used for driving sustain electrodes SU1 to SUn for reuse, a switching element for clamping sustain electrodes SU1 to SUn to voltage Vs, and a switching element for clamping sustain electrodes SU1 to SUn to 0 V so as to generate sustain pulse voltage Vs.

Also in sustain electrode drive circuit 44, an extremely large current needs to be traveled so as to generate sustain discharge by driving sustain electrodes SC1 to SCn. Accordingly, this generates large Joule heat, and the heat generated greatly varies depending on patterns of display images.

Figure 7:
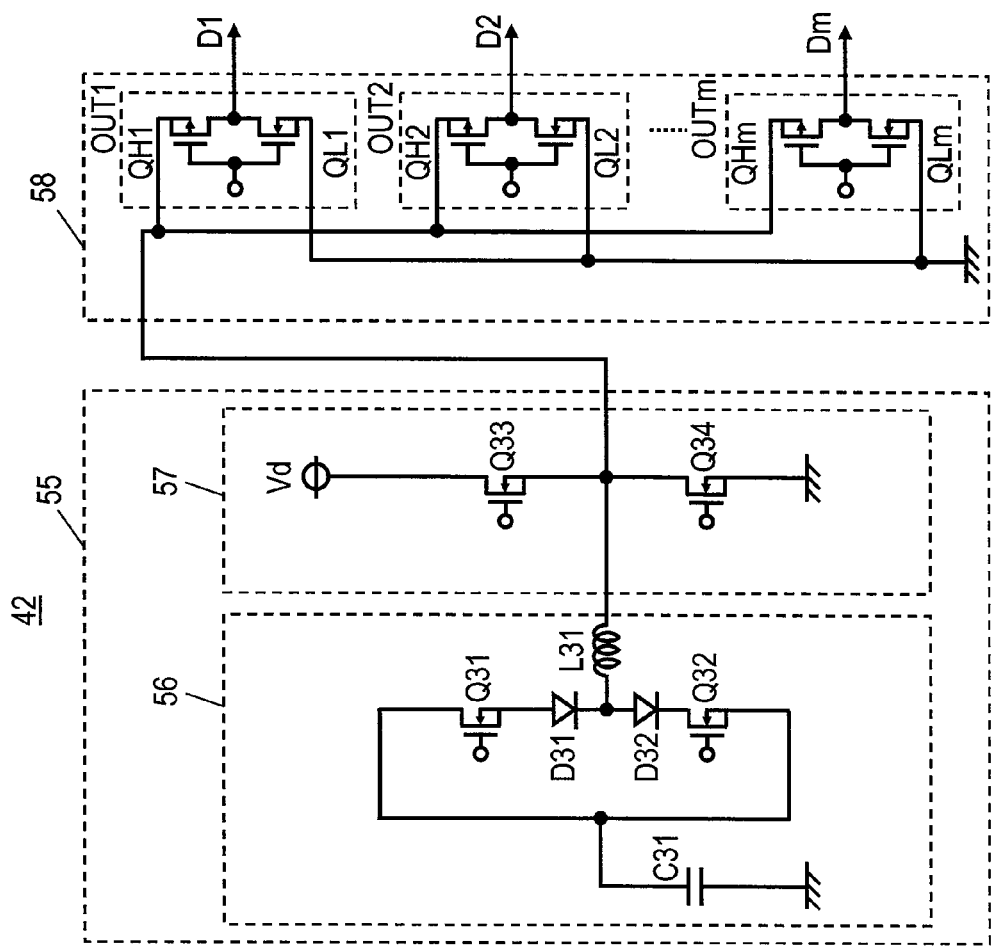
FIG. 7 is a circuit diagram of a data electrode drive circuit in accordance with the exemplary embodiment of the present invention.

Next, details and the operation of data electrode drive circuit 42 are described. FIG. 7 is a circuit diagram of data electrode drive circuit 42 in the exemplary embodiment of the present invention. Data electrode drive circuit 42 includes address pulse generating circuit 55 and address pulse output circuit 58.

Address pulse generating circuit 55 includes power recovery circuit 56 and clamping circuit 57. Power recovery circuit 56 includes power-recovery capacitor C31, switching elements Q31 and Q32, backflow preventing diodes D31 and D32, and resonance inductor L31. Clamping circuit 57 includes switching elements Q33 and Q34. Power supplied to data electrode Dk is recovered to power-recovery capacitor C31 by resonating electrode capacitance of data electrode Dk and resonance inductor L31 so as to generate the address pulse. At the same time, the address pulse generated is output to address pulse output circuit 58.

Address pulse output circuit 58 includes switch units OUT1 to OUTm for outputting an address pulse to each of data electrodes D1 to Dm. Each of switch units OUT1 to OUTm includes switching elements QH1 to QHm for outputting the address pulse output from address pulse generating circuit 55 to data electrodes D1 to Dm, and switching elements QL1 to QLm for grounding data electrodes D1 to Dm. The address pulse output from address pulse generating circuit 55 is output to data electrodes to apply the address pulse by switching the switching elements based on the timing signal output from timing generating circuit 45 and image data output from image signal processing circuit 41.

As described above, an extremely large discharge current needs to be traveled in data electrode drive circuit 42 in order to generate address discharge by driving data electrodes D1 to Dm. This results in generation of large Joule heat. In addition, since generation of address discharge varies depending on patterns of display images, the heat generated also greatly varies depending on patterns of display images.

Next, a structure of plasma display device 1 in the exemplary embodiment of the present invention is described with reference to drawings. In this exemplary embodiment, thermal sensor 49 is used for measuring temperatures. However, this thermal sensor 49 is used for measuring an ambient temperature of plasma display device 1, and not for measuring a temperature of panel 10. In this exemplary embodiment, the temperature of panel 10 is kept at an appropriate level, without being affected by local temperature variations that may occur in panel 10, with a relatively simple structure, by controlling luminance magnification based on this detected temperature so as to control power consumption. This achieves display of high-quality images. Accordingly, the exemplary embodiment features a structure that can reliably detect the ambient temperature of plasma display device 1 by reducing an effect of the heat generated in panel 10 and the heat generated in the drive circuit that greatly varies depending on display images. The structure featured in this exemplary embodiment is described below.

Figure 8A:
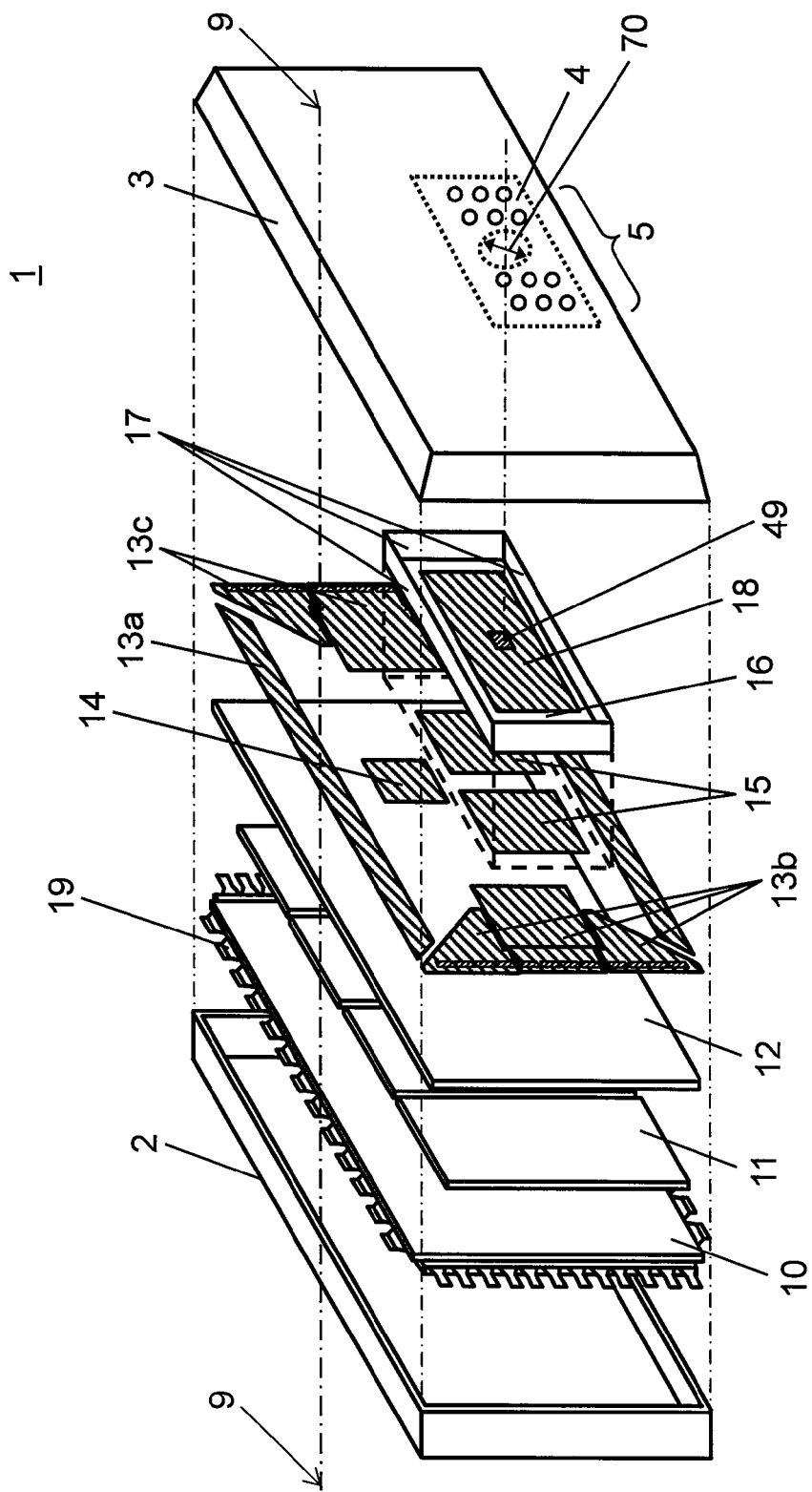
FIG. 8A is an exploded perspective view of an example of a structure of the plasma display device in accordance with the exemplary embodiment of the present invention.
Figure 8B:
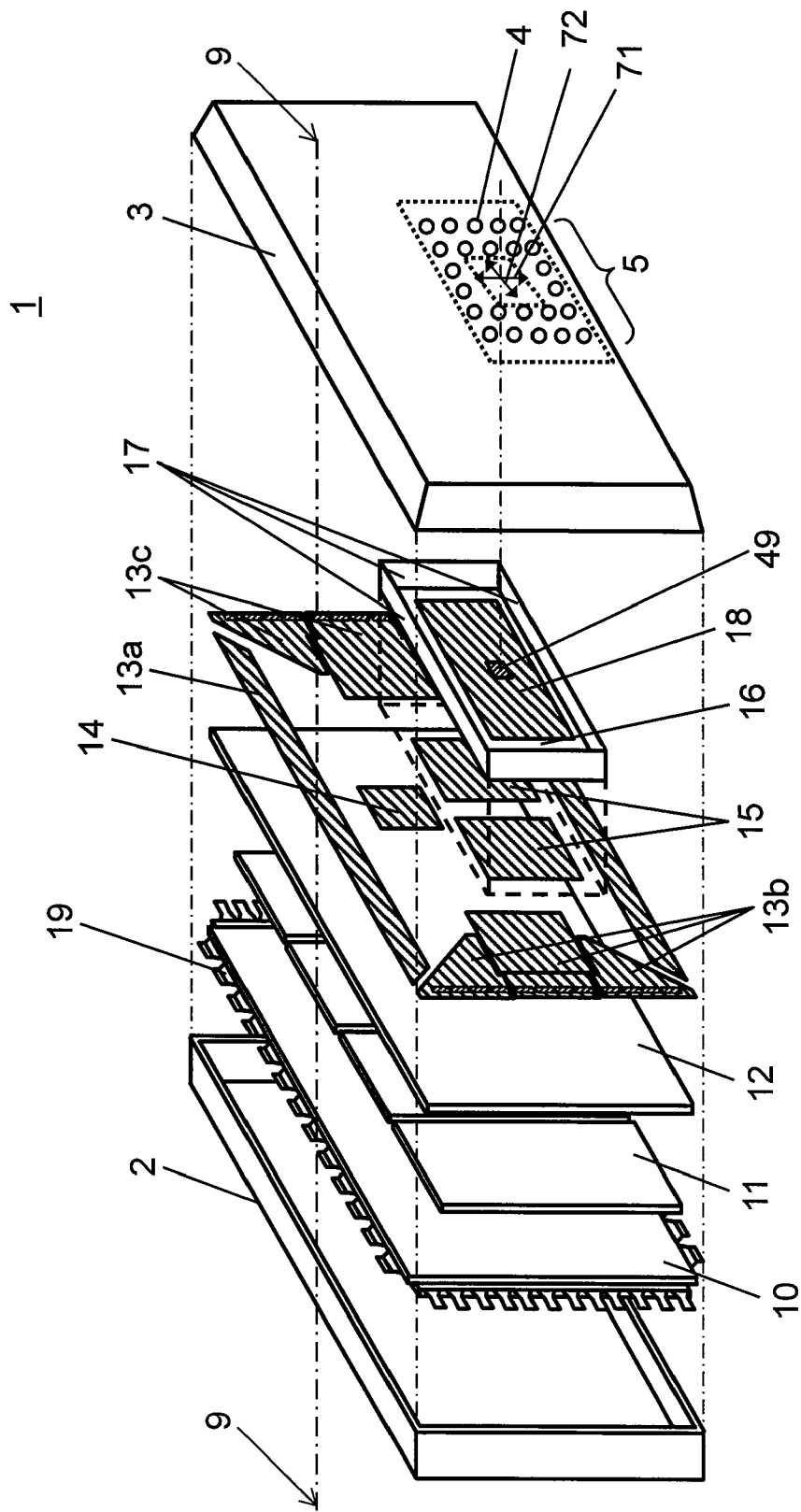
FIG. 8B is an exploded perspective view of another example of the structure of the plasma display device in accordance with the exemplary embodiment of the present invention.
Figure 9:
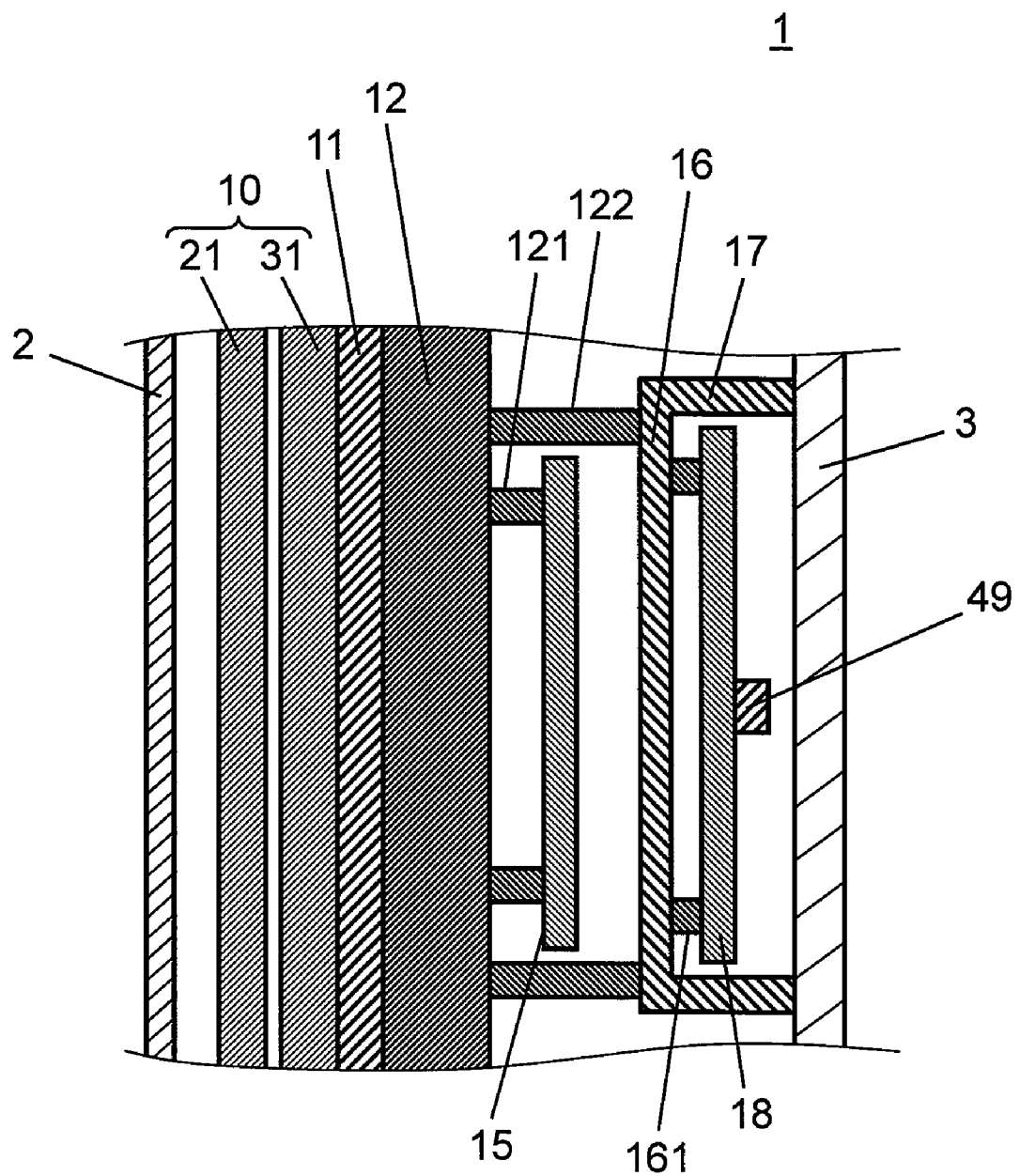
FIG. 9 is a sectional view taken along line 9-9 in FIGS. 8A and 8B.

FIG. 8A is an exploded perspective view of an example of the structure of plasma display device 1 in the exemplary embodiment of the present invention. FIG. 8B is an exploded perspective view of another example of the structure of plasma display device 1 in the exemplary embodiment of the present invention. FIG. 9 is a sectional view taken along line 9-9 in FIGS. 8A and 8B. Plasma display device 1 includes panel 10, heat-conducting sheet 11, chassis 12, a printed circuit board group, thermal sensor fixture 16, tuner board 18, and a casing including front frame 2 and back cover 3 for housing panel 10 and aforementioned components. The printed circuit board group includes data electrode drive circuit board 13a, which is a printed circuit board where data electrode drive circuit 42 is mounted; scan electrode drive circuit board 13b, which is a printed circuit board where scan electrode drive circuit 43 is mounted; sustain electrode drive circuit board 13c, which is a printed circuit board where sustain electrode drive circuit 44 is mounted; power circuit board 14, which is a printed circuit board where a power circuit is mounted; and small-signal processing circuit board 15, which is a printed circuit board where small signal processing circuits such as timing generating circuit 45 and image signal processing circuit 41 are mounted. In the following description, the side of front frame 2 is the front face, and the side of back cover 3 is the rear face.

Heat-conducting sheet 11 is made of generally-known viscous silicone resin. This heat-conducting sheet 11 is interposed between rear plate 31 of panel 10 and chassis 12, and rear plate 31 of panel 10 and chassis 12 are attached. The heat generated in panel 10 is thus transmitted from rear plate 31 to chassis 12.

Chassis 12 is made of a material mainly containing aluminum, which is a well-known material of light, rigid, and high heat conductivity. Chassis 12 holds panel 10 attached to it via heat-conducting sheet 11, and also releases the heat that is generated in panel 10 and transmitted via heat-conducting sheet 11. In addition, a boss (not illustrated) for attaching the printed circuit board group and fixing back cover 3 is integrally formed on the rear face of chassis 12 by die-casting. Chassis 12 and the boss may also be configured by securing a fixing pin onto a flat aluminum sheet.

The printed circuit board group includes data electrode drive circuit board 13a, scan electrode drive circuit board 13b, sustain electrode drive circuit board 13c, power circuit board 13, and small-signal processing circuit board 15. This printed circuit board group is fixed onto the boss on chassis 12 via boss member 121. Boss member 121 is made of a material containing at least aluminum or iron. Boards configuring the printed circuit board group are made of a material that has heat conductivity lower than that of boss member 121. A part of the printed circuit board group is electrically connected to a lead-out portion (not illustrated) led out to a non-display area of panel 10 by multiple flexible cables (FPC) 19 extended over four rims of chassis 12.

More specifically, data electrodes D1 to Dm on panel 10 and data electrode drive circuit board 13a are connected via FPC 19 connected to the lead-out portion of each of data electrodes D1 to Dm. This enables application of drive voltage from data electrode drive circuit 42 to data electrodes D1 to Dm. In the same way, scan electrodes SC1 to SCn on panel 10 and scan electrode drive circuit board 13b are connected via FPC 19 connected to the lead-out portion of each of scan electrodes SC1 to SCn. This enables application of the drive voltage from scan electrode drive circuit 43 to scan electrodes SC1 to SCn. In the same way, sustain electrodes SU1 to SUn on panel 10 and sustain electrode drive circuit board 13c are connected via FPC 19 connected to the lead-out portion of each of sustain electrodes SU1 to SUn. This enables application of the drive voltage from sustain electrode drive circuit 44 to sustain electrodes SU1 to SUn. In this way, the drive voltage generated in each drive circuit board is applied to each electrode on panel 10. In each of drive circuit boards, a large current is generated in line with discharge current, and thus a high heat is generated.

Thermal sensor fixture 16 is fixed onto the boss on chassis 12 via boss member 122. In this exemplary embodiment, boss member 122 is longer than boss member 121 so as to dispose thermal sensor fixture 16 closer to back cover 3, compared to the printed board group including small-signal processing circuit board 15 and other drive circuit boards. Accordingly, thermal sensor fixture 16 is disposed at a position away from panel 10 so as to reduce heat transfer from panel 10 to thermal sensor fixture 16. In addition, a boss (not illustrated) for attaching a printed circuit board is formed on the rear face of thermal sensor fixture 16.

Since thermal sensor fixture 16 blocks the heat transfer from panel 10 to thermal sensor 49, thermal sensor fixture 16 is preferably made of a material that has high effect of blocking heat. However, the material is not limited in this exemplary embodiment. Thermal sensor fixture 16 may be formed of any material including resin and metal.

In this exemplary embodiment, thermal sensor fixture 16 is disposed on the back of small-signal processing circuit board 15. In other words, small-signal processing circuit board 15 is disposed as a shielding between panel 10 and thermal sensor fixture 16. This structure enables positioning of thermal sensor fixture 16 away from each drive circuit board that generates large heat with large variations. In addition, small-signal processing circuit board 15 that has small heat generation and also small variations in heat level serves as a shielding to block the heat generated in panel 10. This exemplary embodiment refers to small-signal processing circuit board 15 as the shielding as an example. However, the shielding is not limited to small-signal processing circuit board 15. For example, the shielding may be achieved by a sheet of resin or metal with low heat conductivity, such as a printed circuit board. This structure enables shielding of thermal sensor 49 from the heat generated in panel 10. Accordingly, the temperature is detectable with further less influence of the heat generated in panel 10.

A tuner circuit (not illustrated) for separating and taking out a television signal from broadcast signals received by an antenna (not illustrated) is mounted on tuner board 18, and this tuner circuit is fixed onto the boss formed on thermal sensor fixture 16 via boss member 161. Thermal sensor 49 is disposed on the rear face (the side of back cover 3) of this tuner board 18. As described above, a board for tuner board 18 is made of a material with heat conductivity lower than that of boss member 161 made of a material containing at least aluminum or iron. Accordingly, the board serves to block heat transfer from panel 10 to thermal sensor 49.

The casing of plasma display device 1 is configured with back cover 3 and front frame 2, and this casing houses panel 10 and aforementioned components. Back cover 3 also has ventilation area 5 including multiple ventilating holes 4 for ventilating between inside and outside of plasma display device 1. Thermal sensor fixture 16 and thermal sensor 49 are disposed at positions such that thermal sensor 49 does not face ventilating holes 4. In addition, thermal sensor fixture 16 and thermal sensor 49 are disposed at positions such that thermal sensor 49 is close to ventilation area 5, and no shielding is interposed between thermal sensor 49 and back cover 3.

In other words, thermal sensor 49 is disposed on thermal sensor fixture 16 via tuner board 18 in this exemplary embodiment. In addition, thermal sensor fixture 16 and thermal sensor 49 are disposed at positions such that they are inside the casing but do not directly contact panel 10, and thermal sensor 49 faces back cover 3 but there is no shielding between thermal sensor 49 and back cover 3. This structure reduces heat transfer amount from panel 10 to thermal sensor 49. Accordingly, thermal sensor 49 can accurately detect the ambient temperature of plasma display device 1.

Thermal sensor fixture 16 and thermal sensor 49 are preferably disposed at positions that thermal sensor 49 faces panel 10 at a height ½ or lower of the height of panel 10. This is because air heated by panel 10 convects upward and stays at an upper part of plasma display device 1. Accordingly, the effect of this heat can be reduced by disposing thermal sensor 49 at a low position.

The tuner circuit uses relatively low voltage of several volts, and thus the heat it generates is also relatively small. In addition, the tuner circuit executes a constant operation continuously regardless of display images, and thus its variations in temperature are also extremely small. Therefore, the effect of this tuner circuit on thermal sensor 49 is small, and its effect can be considered as an offset with respect to the temperature detected by thermal sensor 49 (hereafter temperatures added to the ambient temperature are collectively called the "offset temperature"). Accordingly, there is no practical problem even if thermal sensor 49 and tuner circuit are placed on the same board (in this case, tuner board 18). Furthermore, tuner board 18 can serve as shielding for blocking the heat generated in panel 10 by placing thermal sensor 49 on the rear face of tuner board 18.

Thermal sensor fixture 16 has shielding wall 17 around thermal sensor 49. This shielding wall 17 blocks the heat generated in panel 10, and thus the effect of heat generated in panel 10 on thermal sensor 49 can be further reduced. Shielding wall 17 is preferably formed surrounding thermal sensor 49. However, the shielding effect is also achievable by providing shielding wall 17 only at a lower part of thermal sensor so as to block a convection flow since the heated air convects upward. Alternatively, shielding wall 17 may be provided on both sides of thermal sensor 49. Or, shielding wall 17 may not be necessary. Instead of shielding wall 17, other component that serves in the same way as shielding wall 17 may be disposed around thermal sensor 49.

In this exemplary embodiment, ventilation area 5 with multiple ventilating holes 4 is provided on back cover 3. Ventilation area 5 provided on back cover 3 is close to thermal sensor 49 at a position that thermal sensor 49 and ventilating holes 4 do not face each other. More specifically, as shown in FIG. 8A, ventilating holes 4 are created at positions away by predetermined diameter 70 or more from the center, which is a point on back cover 3 facing thermal sensor 49. Predetermined diameter 70 is, for example, preferably 20 mm or more. As shown in FIG. 8A, ventilating holes 4 may be created at the right and left of the center, which is a point on back cover 3 facing thermal sensor 49. Also as shown in FIG. 8B, ventilating holes 4 may be created at positions at the right, left, top, and bottom of the center, which is a position facing thermal sensor 49 on back cover 3. In other words, ventilating holes 4 may be disposed at positions away from the center by a rectangular area having predetermined height 71 and predetermined width 72, when the center is a point on back cover 3 facing thermal sensor 49. Predetermined height 71 and predetermined with 72 are, for example, preferably 20 mm or more, respectively.

A distance between thermal sensor 49 and back cover 3 is not less than a first predetermined distance and not greater than a second predetermined distance. In this exemplary embodiment, the first predetermined distance is, for example, 5 mm±2 mm and the second predetermined distance is, for example, 15 mm±5 mm. The reason is given below.

The inventor of the present invention experimentally confirms that a detection error of ambient temperature increases when thermal sensor 49 is too close to ventilating holes 4. This is because air entering through ventilating holes 4 behaves as if it is wind toward thermal sensor 49, and thus an effect of wind becomes stronger as thermal sensor 49 is closer to ventilating holes. On the other hand, if thermal sensor 49 is too far from ventilating holes 4, a detection error of ambient temperature also increases. When the distance is set within aforementioned numeric range, the ambient temperature of the plasma display device is most accurately detected. Accordingly, in this exemplary embodiment, thermal sensor 49 and ventilating holes 4 are not facing each other, and the distance from thermal sensor 49 to back cover 3 is set within the above numeric range. However, the structure and numeric values are not limited to the above. They may be appropriately set based on the structure of plasma display device 1, performance of thermal sensor 49, shape and position of ventilating hole 4, and so on.

Figures 10, 11:
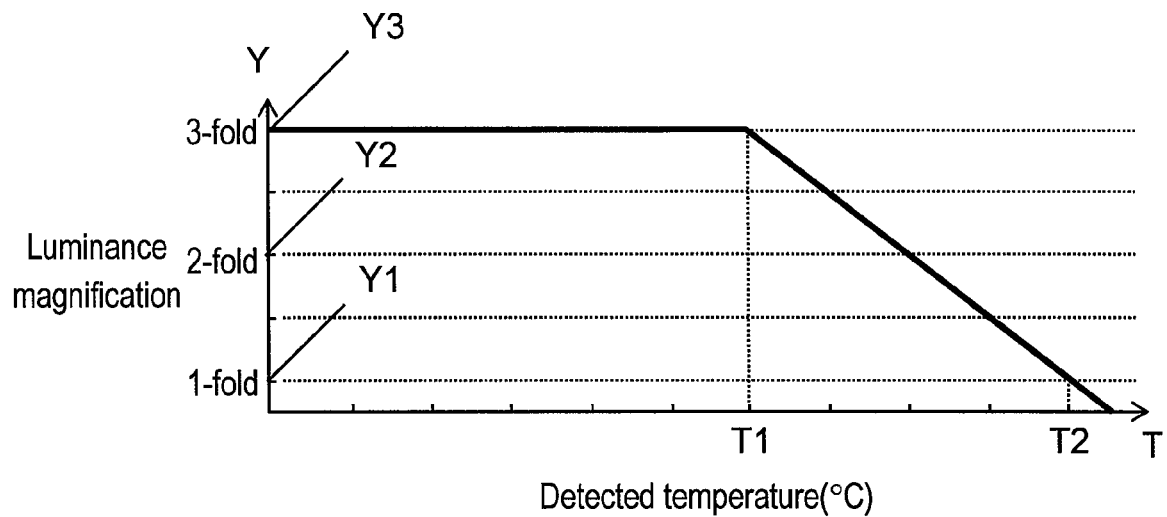
FIG. 10 is a schematic diagram illustrating a relationship between a temperature detected by a thermal sensor and luminance magnification in accordance with the exemplary embodiment of the present invention.
FIG. 11 is a schematic diagram illustrating the relationship among an ambient temperature, luminance magnification, assumed maximum temperature rise, and assumed maximum panel temperature.

Next, the relationship between the detected temperature of thermal sensor 49 and luminance magnification in this exemplary embodiment is described. FIG. 10 is a chart illustrating the relationship between detected temperature T of the thermal sensor and luminance magnification in this exemplary embodiment of the present invention.

In this exemplary embodiment, a temperature detected by thermal sensor 49 is compared with a predetermined temperature so as to control luminance magnification Y. More specifically, as shown in FIG. 10, if the temperature detected by thermal sensor 49 is less than first predetermined temperature T1 (45° C. in this exemplary embodiment), luminance magnification Y is set to three-fold, which is first predetermined luminance magnification Y3. If the temperature detected by thermal sensor 49 is the same or higher than first predetermined temperature T1, luminance magnification Y is gradually reduced such that the luminance magnification when the detected temperature is second predetermined temperature T2 (65° C. in this exemplary embodiment) becomes one-fold, which is second predetermined luminance magnification Y1. In other words, the drive circuits including data electrode drive circuit 42, scan electrode drive circuit 43, and sustain electrode drive circuit 44 set luminance magnification Y to first predetermined magnification Y3 when the temperature detected by thermal sensor 49 is the same or lower than first predetermined temperature T1, and set luminance magnification Y to second predetermined magnification Y1 when the temperature detected by thermal sensor 49 is second predetermined temperature T2. When the temperature detected by thermal sensor 49 exceeds first predetermined temperature T1, luminance magnification is set as follows:

$$Y=(Y3-Y1)(T-T2)/(T1-T2)+Y1.$$

Whereas, Y denotes luminance magnification, T denotes the temperature detected by the thermal sensor, T1 denotes the first predetermined temperature, T2 denotes the second predetermined temperature, Y3 denotes the first predetermined magnification, and Y1 denotes the second predetermined magnification.

As described above, power consumption in panel 10 is controlled so as to adjust temperature of panel 10 by controlling luminance of a display image based on the temperature detected by thermal sensor 49 in this exemplary embodiment. This keeps an appropriate temperature for panel 10. Reasons are given below.

In panel 10, temperature of panel 10 itself increases by the heat generated at displaying an image. The inventor finds that the temperature of panel 10 at this point is a sum of a panel temperature when panel 10 is not driven, which is an ambient temperature of plasma display device 1, and a temperature of heat generated by driving panel 10. In other words, although the same pattern of image is displayed, the temperature of panel 10 changes if the ambient temperature of plasma display device 1 changes.

In addition, a temperature rise of panel 10 depends on a display image and luminance magnification Y. Accordingly, a temperature rise while changing luminance magnification Y is measured when a pattern of image that causes the highest rise in the temperature of panel 10 (e.g., the temperature of panel 10 increases the most, though partially, in an area of 100% luminance in a window pattern with 100% luminance) is displayed. Then, the assumed maximum temperature of panel 10 can be easily and accurately estimated by adding the ambient temperature and this temperature rise.

In plasma display device 1, temperature of panel 10 needs to be kept below the maximum temperature in an operation guarantee range of panel 10 even if plasma display device 1 is operated at the maximum temperature within the operation guarantee range.

FIG. 11 is a table illustrating the relationship of ambient temperature, luminance magnification Y, assumed maximum temperature rise, and assumed maximum panel temperature.

In an experiment conducted by the inventor, a temperature rise of 60° C., relative to the ambient temperature, in three-fold luminance magnification, 50° C. in two-fold luminance magnification, and 40° C. in one-fold luminance magnification are confirmed. Accordingly, the assumed maximum temperature rise relative to the ambient temperature in each luminance magnification is 60° C., 50° C., and 40° C.

As described above, if the maximum temperature in the operation guarantee range of plasma display device 1 is, for example, 60° C., and the maximum temperature of panel 10 in the operation guarantee range is 100° C., the temperature of panel 10 needs to be controlled such that the temperature of panel 10 does not exceed 100° C. when plasma display device 1 is used under the environment of 60° C.

In other words, luminance magnification Y is set to the maximum threefold when the ambient temperature is 40° C. or lower in this exemplary embodiment. When the ambient temperature is 50° C., luminance magnification Y is two-fold. When the ambient temperature is 60° C., which is the maximum temperature in the operation guarantee range of plasma display device 1, luminance magnification Y is one-fold. The assumed maximum temperature rise is 60° C. when luminance magnification y is threefold. The assumed maximum temperature rise is 50° C. when luminance magnification Y is two-fold. When luminance magnification Y is one-fold, the assumed maximum temperature rise is 40° C. In any case, the temperature does not exceed the maximum temperature in the operation guarantee range of panel 10, and thus panel 10 can be used within the operation guarantee range.

To realize this control, however, it is important to accurately detect the ambient temperature of plasma display device 1 as much as possible. With the aforementioned structure in this exemplary embodiment, an effect of the heat generated in panel 10 is reduced, and thus the ambient temperature of plasma display device 1 can be accurately detected.

As described above, a temperature detected by thermal sensor 49 includes a faint offset temperature in addition to the ambient temperature of plasma display device 1. This offset temperature is set to about 5° C. in this exemplary embodiment. Accordingly, first predetermined temperature T1 is 45° C., which is 40° C. plus 5° C.; and second predetermined temperature T2 is 65° C., which is 5° C. added to the upper limit of an operation guarantee temperature of plasma display device 1. However, the exemplary embodiment is not limited to these values. It may be set appropriately, taking into account the structure of plasma display device 1.

As described above, in this exemplary embodiment, the aforementioned structure of plasma display device 1 reduces the effect of heat generated in panel 10 and enables accurate detection of the ambient temperature of plasma display device 1. In addition, since only one thermal sensor is needed for detecting temperature, the structure is relatively simple. By controlling power consumption in panel 10 based on the temperature detected in this way, the temperature of panel 10 can be maintained at an appropriate level without being affected by local temperature variations in panel 10. Accordingly, high-quality images can be displayed.

This exemplary embodiment refers to the structure of controlling power consumption by controlling luminance magnification. However, the structure for controlling power consumption is not limited to this structure. Any structure, including control of subfield structure for controlling power consumption, is applicable. The structure for detecting the ambient temperature in this exemplary embodiment, as described above, is effectively applicable to a structure for adjusting the panel temperature, and thus it can be employed in diversifying structures.

The above experiment uses a 50" panel with 1080 display electrode pairs, and aforementioned values are determined based on this panel. Accordingly, the exemplary embodiment is not limited to these numeric values. It is preferable to set appropriate values in accordance with panel characteristics and specifications and structures of plasma display device. Each numeric value accepts variations within a range that the aforementioned effect is achievable.

INDUSTRIAL APPLICABILITY

The present invention keeps an appropriate panel temperature with a relatively simple structure in a plasma display device with a large screen and high luminance so as to display high-quality images. Accordingly, the present invention is efficiently applicable to plasma display devices.

The invention claimed is:

1. A plasma display device comprising:
   a plasma display panel including a plurality of discharge cells, each of the discharge cells including a scan electrode, a sustain electrode, and a data electrode;
   a back cover disposed facing the plasma display panel;
   a thermal sensor disposed facing the back cover;
   a chassis disposed on a rear face of the plasma display panel, a heat-conducting sheet being interposed between the plasma display panel and the chassis;
   a drive circuit board disposed on a rear face of the chassis, a drive circuit for driving an electrode being mounted on the drive circuit board; and
   a thermal sensor fixture for installing the thermal sensor; plasma display panel;
   wherein
   the thermal sensor fixture and the thermal sensor are disposed between the plasma display panel and the back cover; and
   a small-signal processing circuit board disposed on the rear face of the chassis, a small-signal processing circuit for processing a signal with low voltage, compared to the drive circuit, being mounted on the small-signal processing circuit board, is disposed between the plasma display panel and the thermal sensor fixture.

2. The plasma display device of claim 1,
   wherein
   the thermal sensor fixture is disposed at a position closer to the back cover, relative to the small-signal processing circuit board and the drive circuit board; and the thermal sensor fixture is disposed at a position further away from the drive circuit board than the small-signal processing circuit board.

3. The plasma display device of claim 2, wherein the thermal sensor fixture has a shielding wall for blocking heat generated in the plasma display panel, the shielding wall surrounding the thermal sensor.

4. The plasma display device of claim 2, wherein the thermal sensor fixture has a shielding wall around the thermal sensor.

5. The plasma display device of claim 2, wherein the thermal sensor fixture is disposed on a rear face of the small-signal processing circuit board.

6. The plasma display device of claim 2, wherein a board is provided on the thermal sensor fixture via a boss material, and the thermal sensor is disposed on the board.

7. The plasma display device of claim 6, wherein the boss material includes at least one of aluminum and iron, and the board has heat conductivity lower than the boss material.

8. The plasma display device of claim 2, wherein the drive circuit controls luminance of a display image based on a temperature detected by the thermal sensor.

9. The plasma display device of claim 8, wherein the drive circuit sets a luminance magnification to:
- a first predetermined luminance magnification when temperature detected by the thermal sensor is not greater than the a first predetermined temperature;
- a second predetermined luminance magnification when the temperature detected by the thermal sensor is a second predetermined temperature; and
- $Y=(Y3-Y1)(T-T2)/(T1-T2)+Y1$, when the temperature detected by the thermal sensor exceeds the first predetermined temperature, whereas Y denotes luminance magnification, T denotes the temperature detected by the thermal sensor, T1 denotes the first predetermined temperature, T2 denotes the second predetermined temperature, Y3 denotes the first predetermined luminance magnification, and Y1 denotes the second predetermined luminance magnification.

10. The plasma display device of claim 1, further comprising a ventilation area with a plurality of ventilating holes on the back cover; the plurality of ventilating holes being provided at positions away from a center by not less than a predetermined diameter, the center being a point on the back cover facing the thermal sensor.

11. The plasma display device of claim 1, further comprising a ventilation area with a plurality of ventilating holes on the back cover, the plurality of ventilating holes being provided at positions away from a center by a rectangular area with a predetermined height and a predetermined width, the center being a point on the back cover facing the thermal sensor.

12. The plasma display device of claim 1, wherein the thermal sensor is disposed at a position such that a distance between the thermal sensor and the back cover is not less than a first predetermined distance and not greater than a second predetermined distance.

13. The plasma display device of claim 1, wherein the thermal sensor is disposed at a height not greater than a half of a height of the plasma display panel, and faces the plasma display panel.

* * * * *

UNITED STATES PATENT AND TRADEMARK OFFICE
CERTIFICATE OF CORRECTION

PATENT NO. : 8,330,343 B2
APPLICATION NO. : 12/528136
DATED : December 11, 2012
INVENTOR(S) : Yasuhito Fukui It is certified that error appears in the above-identified patent and that said Letters Patent is hereby corrected as shown below:

In the Claims:

At Column 18, line 44, in Claim 1, "the thermal sensor; plasma display panel" should read --the thermal sensor;--

Signed and Sealed this
Twenty-third Day of April, 2013

Teresa Stanek Rea
*Acting Director of the United States Patent and Trademark Office*